W. H. WEST.
DIRECTION INDICATOR.
APPLICATION FILED MAY 26, 1917.
1,262,724.
Patented Apr. 16, 1918.
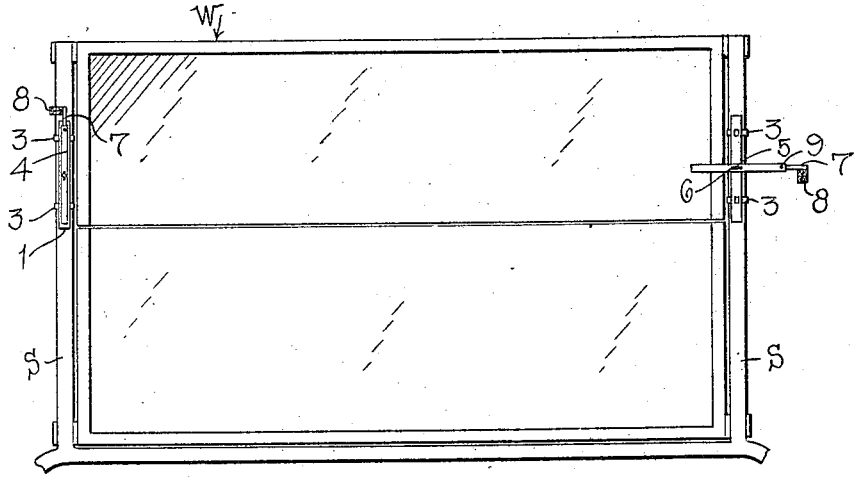
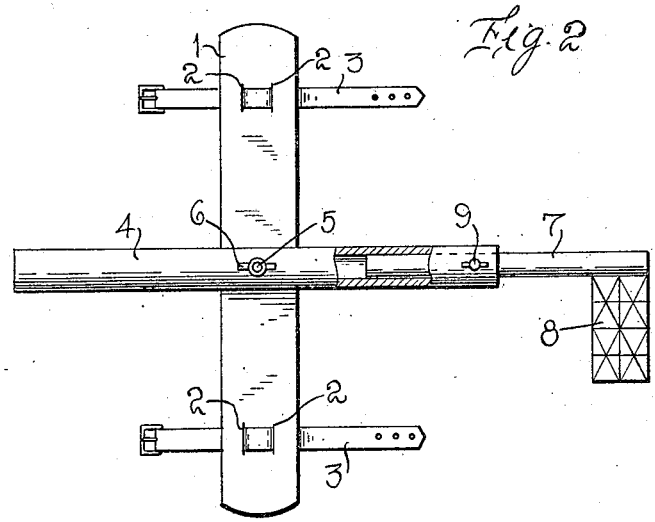
Inventor
WILLIAM H. WEST
By Watson E. Coleman
Attorney

UNITED STATES PATENT OFFICE.

WILLIAM H. WEST, OF LOS ANGELES, CALIFORNIA.

DIRECTION-INDICATOR.

1,262,724.   Specification of Letters Patent.   Patented Apr. 16, 1918.

Application filed May 26, 1917. Serial No. 171,201.

*To all whom it may concern:*

Be it known that I, WILLIAM H. WEST, a citizen of the United States, residing at Los Angeles, in the county of Los Angeles and State of California, have invented certain new and useful Improvements in Direction-Indicators, of which the following is a specification, reference being had to the accompanying drawings.

This invention relates to certain improvements in direction indicators and has relation more particularly to a device of this general character especially designed and adapted for use in connection with automobiles or other vehicles, and it is an object of the invention to provide a novel and improved device of this general character comprising a member mounted for swinging movement and arranged adjacent the forward end of the vehicle and adapted to be swung to one side thereof so that a warning or signal may be given to indicate the direction in which a turn is to be made.

The invention consists in the details of construction and in the combination and arrangement of the several parts of my improved direction indicator whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a fragmentary view in elevation of the forward portion of an automobile illustrating a direction indicator constructed in accordance with an embodiment of my invention; and Fig. 2 is an enlarged view partly in elevation and partly in section illustrating my improved indicator, as herein embodied.

As disclosed in the accompanying drawings S denotes the standards or uprights arranged at the forward end portion of an automobile and which serve as a support for the wind shield W. As herein disclosed, an indicator constructed in accordance with an embodiment of my invention is adapted to be attached to each of said posts or uprights and as illustrated in Fig. 1, one of said indicators is shown in a position to give a signal or warning that a turn is to be made while the second indicator is in a neutral position.

As is particularly illustrated in Fig. 2 my improved indicator comprises an elongated plate 1 provided adjacent each of its opposite ends with a pair of transversely spaced slots 2 through which is threaded a strap 3 or other anchoring member whereby the plate 1 may be readily and conveniently applied to a standard or upright S. It is to be understood that the plate 1 has its longitudinal axis vertically disposed and that said plate overlies the inner face of the post or upright S to which it is applied.

4 denotes a tubular member pivotally engaged at substantially its longitudinal center with the central portion of the plate 1 through the medium of the shank 5 extending outwardly from the plate and with which coacts the clamping nut 6. Telescopically engaged with one end portion of the member 4 is a rod 7 provided at its outer end with a signal or indicator 8 which may be as desired. The rod 7 is maintained in its adjustment longitudinally of the member through the medium of a set screw 9 disposed through an end portion of the member 4 and coacting with the rod 7 in the well known manner.

The member 4 can also be locked in its various positions through the medium of the clamping nut 6 or the clamping nut 6 may be so adjusted as to result in sufficient friction to hold the rod 4 against movement under normal conditions but readily permitting the rod 4 to be swung about the member 5 when it is desired to indicate a change in the direction of travel of the automobile or to return the member 4 and the signal 8 to a neutral position.

From the foregoing description, it is thought to be obvious that a direction indicator constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

A direction indicator consisting of an elongated plate provided with securing means adjacent its opposite ends whereby the plate may be detachably engaged to a support, a shank extending outwardly from the plate at a point substantially midway between the securing means, an elongated member pivotally engaged at substantially its longitudinal center with said shank, a clamping nut engageable with the free end portion of the shank and coacting with the elongated member for holding the same against movement about the shank, and an indicator carried by one end portion of the elongated member.

In testimony whereof I hereunto affix my signature in the presence of two witnesses.

WILLIAM H. WEST.

Witnesses:
JOHN C. PACKARD,
M. G. FERRABIAN.

Copies of this patent may be obtained for five cents each, by addressing the "Commissioner of Patents, Washington, D. C."